United States Patent
Berchtold et al.

(10) Patent No.: US 8,398,795 B2
(45) Date of Patent: Mar. 19, 2013

(54) METHOD FOR PRODUCING A FIBER CONNECTION COMPONENT

(75) Inventors: Gerd Berchtold, Weilheim (DE); Stefan Utecht, Kaufering (DE)

(73) Assignee: EADS Deutschland GmbH, Ottobrunn (DE)

( * ) Notice: Subject to any disclaimer, the term of this patent is extended or adjusted under 35 U.S.C. 154(b) by 583 days.

(21) Appl. No.: 12/404,689

(22) Filed: Mar. 16, 2009

(65) Prior Publication Data

US 2009/0229748 A1   Sep. 17, 2009

(30) Foreign Application Priority Data

Mar. 17, 2008 (DE) .................. 10 2008 014 657

(51) Int. Cl.
  *B29C 65/18* (2006.01)
  *B29C 70/34* (2006.01)
  *B29C 70/40* (2006.01)
(52) U.S. Cl. .............. 156/87; 156/245; 156/309.6
(58) Field of Classification Search .............. 156/87, 156/245, 309.6
See application file for complete search history.

(56) References Cited

U.S. PATENT DOCUMENTS

| 4,622,091 A | * | 11/1986 | Letterman ............. 156/286 |
| 4,828,472 A | * | 5/1989 | Itoh et al. ............. 425/143 |
| 5,348,335 A | | 9/1994 | Dasarmaux et al. |
| 2002/0053400 A1 | | 5/2002 | Lorenz et al. |
| 2003/0011094 A1 | * | 1/2003 | Filsinger et al. ......... 264/102 |
| 2004/0146696 A1 | | 7/2004 | Jones |
| 2005/0255766 A1 | * | 11/2005 | Kruger et al. ............ 442/21 |

FOREIGN PATENT DOCUMENTS

| DE | 692 06 244 T2 | 4/1996 |
| DE | 100 50 851 A1 | 4/2002 |
| DE | 602 08 358 T2 | 9/2006 |
| EP | 1 181 149 B1 | 2/2002 |
| EP | 1 588 838 A1 | 10/2005 |

* cited by examiner

*Primary Examiner* — Michael Tolin
(74) *Attorney, Agent, or Firm* — Crowell & Moring LLP

(57) ABSTRACT

In a process of producing a composite fiber component, fiber-containing layers pre-impregnated with resin and dry fiber-containing layers are alternately deposited on one another. The pre-impregnated fiber-containing layers have an excess of resin. The fiber composite component is integrated by causing the excess resin of the pre-impregnated layers to infiltrate the adjacent dry fiber-containing layers.

9 Claims, 2 Drawing Sheets

METHOD FOR PRODUCING A FIBER CONNECTION COMPONENT

This application claims the priority of German patent document 10 2008 014 657.9, filed Mar. 17, 2008, the disclosure of which is expressly incorporated by reference herein.

The invention relates to a process of producing composite fiber components.

In the production of fiber-reinforced synthetic components, the use of semi-finished fiber products pre-impregnated with resin (so-called "prepregs") is well known. The individual prepregs are first deposited on one another to form the component that is to be produced, and subsequently an infiltration treatment and a hardening of the component are performed by applying pressure and/or heat.

A so-called hot-forming process is also known, in which the just deposited components impregnated with resin are shaped into complex shapes while using heat in a further process step.

Another known process is the so-called RFI process (resin film infusion), in which the composite fiber component is constructed by depositing firm resin films without a fiber fraction on the dry semi-finished fiber product. The infiltration takes place by a subsequent addition of heat causing the resin of the resin film to melt and to infiltrate the semi-finished fiber product disposed underneath.

A disadvantage of the use of prepregs, as well as of the RFI process, is the fact that the ability of the materials to be draped, which is of great importance particularly when producing curved component shapes, is limited. In the case of a prepreg process, the draping becomes difficult because of the adhesion between the individual fiber layers, while in the RFI process, there is no bonding at all between the individual layers before the infiltration, so that the positioning and fixing of the individual layers with respect to one another becomes difficult. In addition, in the RFI process, the height of the layer construction is relatively large in comparison with the thickness of the hardened component, which results in long consolidation paths within the material during the hardening.

One object of the present invention, therefore is, to provide a process of producing composite fiber components which achieves a very good draping capability of the materials.

This and other objects and advantages are achieved by the production process according to the invention, in which fiber-containing layers pre-impregnated with resin (i.e., prepregs) and dry fiber-containing layers are alternately deposited on one another. The pre-impregnated fiber-containing layers have an excess of resin, which is sufficient to infiltrate the adjacent dry layers with the resin of the pre-impregnated layers. As a result, a very good draping capability of the material is achieved because the pre-impregnated layers have no adhesion with respect to one another, and the dry layers are relatively easily movable relative to the pre-impregnated layers. Moreover, the pre-impregnated layers act as binders and facilitate the positioning and attachment of the dry layers. The use of additional binder materials, such as a binding nonwoven, is thus unnecessary.

Furthermore, by means of the process according to the invention, it is very easy first to deposit the fiber material in a flat manner for the production of complex structures (such as spar structures), and shape it in a further process step by using heat. By means of the process according to the invention, such an approach can be carried out at lower expenditures than in the case of the known hot-forming processes.

The process according to the invention can provide a component which is optimized with respect to weight and strength. Moreover, the residual air and other volatile constituents can easily be removed from the layer construction by way of the dry layers.

As a rule, the resin of the prepregs present in the construction is sufficient for complete infiltration of the component, so that provision of an additional infiltration with additional resin, heating and additional infiltration times are unnecessary. However, such an additional infiltration is not excluded.

The hardening and/or infiltration of the component can be performed, for example, in an autoclave, a forced-air oven with or without a pressurization, a press or a heated tool. In an advantageous embodiment, the hardening and/or the infiltration can take place by using a semi-permeable membrane which closes off the composite fiber component from the environment. The membrane is impervious to resin but permeable to air, permitting residual venting of the component. (See, for example, European Patent Document EP 1 181 149 B1.) Pressurization during the infiltration treatment or hardening of the composite fiber component may be generated mechanically, hydraulically or pneumatically.

The process according to the invention can be implemented continuously (for example, by interval hot pressing), which is suitable particularly for smaller components (such as profiles), or as a static process (such as autoclave, oven process).

The fiber-containing layers may consist of one or more layers of a woven structure, a laid structure, or one or more unidirectional fibers layers. Particularly glass fibers, carbon fibers, aramid fibers or a combination thereof can be used as fiber materials. This information applies to the dry as well as to the pre-impregnated layers. The used resins may be based on thermosetting plastics or thermoplastics.

In a further embodiment of the process according to the invention, it is possible to control the course of the flow boundaries of the resin in a targeted manner during the infiltration or hardening, by designing the hardening tool to accommodate the applicable thermal demands (for example, variable wall thicknesses). Another possibility is the targeted controlling of heating circuits integrated in the tool.

Other objects, advantages and novel features of the present invention will become apparent from the following detailed description of the invention when considered in conjunction with the accompanying drawings.

DETAILED DESCRIPTION OF THE DRAWINGS

Figure 1:
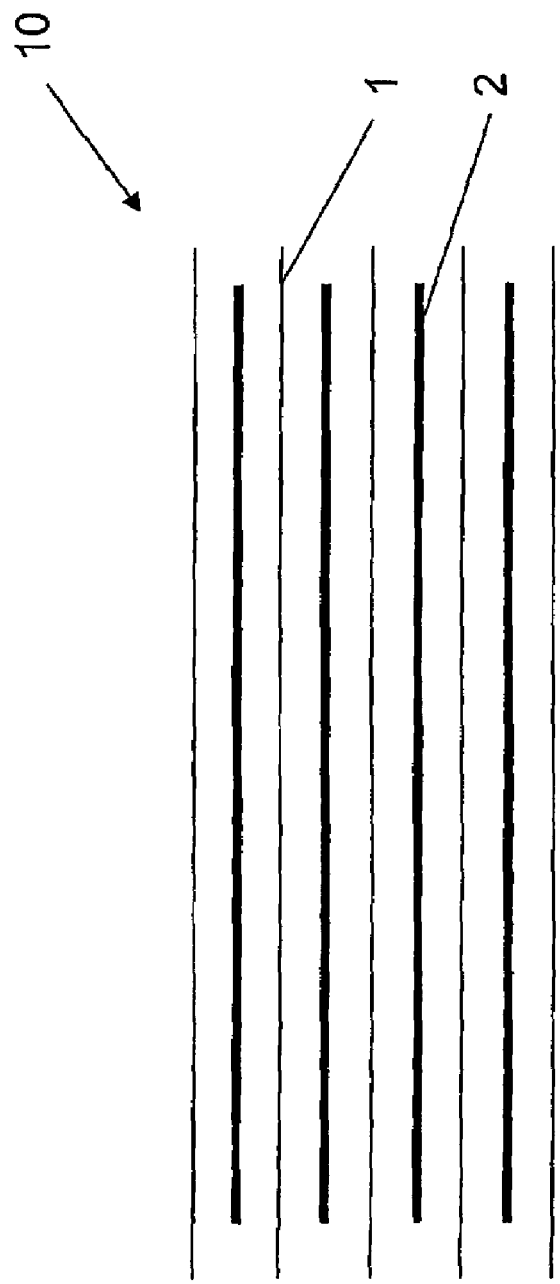
FIG. 1 shows the layer construction of the composite fiber component produced by the process according to the invention.

FIG. 1 shows the hybrid layer construction of a composite fiber component 10, as produced by the process according to the invention. It alternately comprises dry layers 1 and pre-impregnated fiber layers 2, which are successively deposited on one another, with the pre-impregnated fiber layers 2 having an excess of resin.

Figure 2:
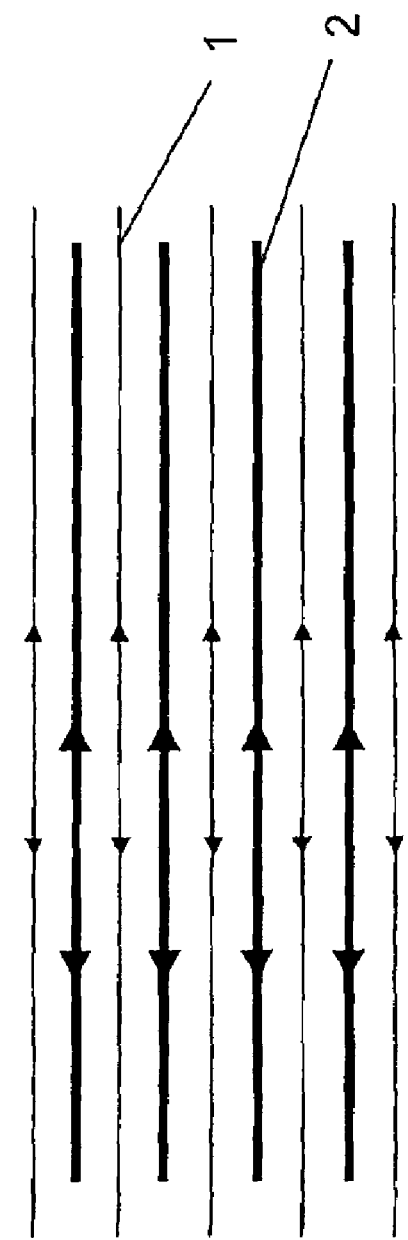
FIG. 2 shows the layer construction of FIG. 1, with a representation of the mobility of the individual layers with respect to one another.

Since the pre-impregnated layers 2 are separated from one another by the respective dry layers 1, they have no adhesion with respect to one another. Moreover, as illustrated schematically by arrows in FIG. 2, the dry layers 1 are sufficiently movable with respect to the pre-impregnated layers 2 that the fiber construction can be draped very easily. Because of the presence of the pre-impregnated layers 2, the layers are sufficiently fixed with respect to one another. In addition, because of the good draping capability, the component can easily be reshaped by changing the component geometry.

Figure 3:
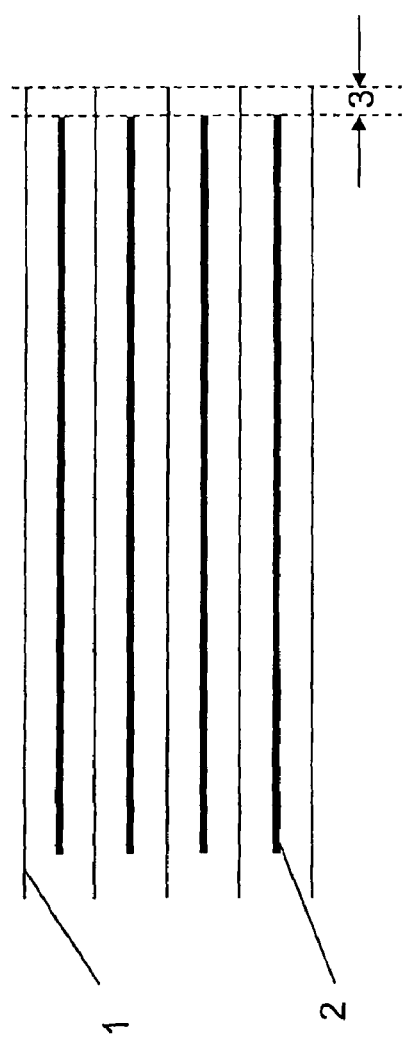
FIG. 3 shows the layer construction of FIG. 1, with a representation of the projection of the dry layers at the edge of the layer construction.

A further advantage of the hybrid construction consisting of dry 1 and pre-impregnated 2 layers that, by way of the dry layers 1, residual air and other volatile constituents can be removed from the component very effectively by suction. As illustrated in FIG. 3, for this purpose, the dry layers 1 on the edges of the component 10 advantageously project beyond the pre-impregnated layers 2 (projection 3). This mainly takes place for avoiding a coating with resin at the end of the dry layers 1, so that the suction removal paths cannot be blocked.

Figure 4:
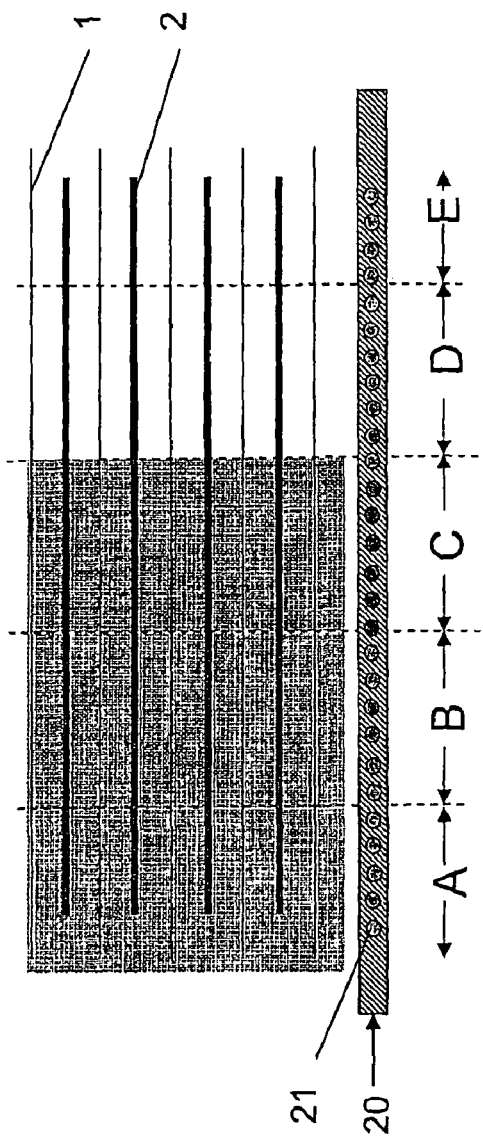
FIG. 4 shows the layer construction of FIG. 1, with a representation of the flow boundary control of the resin during the infiltration or hardening.

FIG. 4 shows an embodiment in which the flow boundary of the resin can be controlled in a targeted manner during the infiltration/hardening. For this purpose, spatially distributed heating elements 21 are placed in the tool 20, extending in a linear arrangement parallel to the fiber-containing layers of the component. Here, the individual heating elements 21 are assigned to five heating zones A to E. The heating elements assigned to the individual heating zones can be controlled independently of the heating elements of the other heating zones.

In the embodiment according to FIG. 4, the flow boundary of the resin is shown as moving from the left to the right component edge. In particular, FIG. 4 shows the flow boundary when it has arrived approximately halfway between the two component edges. The temperature is currently the highest in the central heating zone C while, in heating zones A and B, in which the infiltration has already taken place, the temperature has already fallen again (the temperatures are symbolized by different levels of gray). The heating zone E at the right-hand edge has not yet been reached by the flow boundary; its temperature there is still at a lower level compared with zone C. Heating zone D will be reached next by the flow boundary in that the heating elements of this zone are activated.

As a result of this targeted spatial control of the infiltration, air situated in the component and other volatile constituents can be removed as completely as possible.

In contrast to the embodiment illustrated in FIG. 4 having a flow boundary moving from one side of the component to the other side, the flow boundary control can be controlled in such a manner that the start takes place, for example, in the center of the components and several flow boundaries move to the component edges in opposite directions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing composite fiber components, said process comprising:
    alternately depositing fiber-containing layers pre-impregnated with resin and dry fiber-containing layers on one another, the pre-impregnated fiber-containing layers having an excess of resin; and
    causing said excess resin in said pre-impregnated layers to infiltrate said dry fiber-containing layers,
    wherein, after the depositing of the layers, the infiltration of the composite fiber component takes place while heat is added,
    wherein flow boundaries of the resin, during the infiltration, are controlled by feeding heat that is variable with respect to time and space, and
    wherein the temporally and spatially variable feeding of heat is performed by a defined time-related activation of a heating medium spatially distributed in a tool so that a temperature of the tool at the flow boundaries of the resin is greater than temperatures of the tool outside of the flow boundaries of the resin.

2. The process according to claim 1, wherein the fiber-containing layers comprise at least one layer having a structure that is one of woven and laid, and at least one unidirectional fiber layer.

3. The process according to claim 1, wherein the fiber-containing layers contain one of glass fibers, carbon fibers, aramid fibers, and a combination thereof.

4. The process according to claim 1, further comprising residual venting of the composite fiber component using a semi-permeable membrane which is permeable to air but impervious to resin.

5. The process according to claim 1, wherein the layers are deposited with edges of the dry layers projecting beyond edges of pre-impregnated layers.

6. The process according to claim 1, wherein the temporally and spatially variable feeding of heat is performed using a hardening tool of a correspondingly developed design.

7. The process according to claim 1, wherein:
    pressure is applied during the infiltration treatment; and
    said pressure is generated by a technique selected from the group consisting of a mechanical, hydraulic and pneumatic pressure.

8. The process according to claim 1, wherein the process is one of static and continuous.

9. The process according claim 1, wherein:
    the fiber-containing layers are first deposited in a flat configuration; and
    the fiber-containing layers are subsequently shaped while being heated.

\* \* \* \* \*